United States Patent [19]

Gosset et al.

[11] Patent Number: 4,711,794

[45] Date of Patent: Dec. 8, 1987

[54] AMYLACEOUS COMPOSITION FOR MIXTURES BASED ON SYNTHETIC OR NATURAL BINDERS EMPLOYED IN THE MANUFACTURE OF CERTIAN TEXTILE OR PARATEXTILE PRODUCTS, PARTICULARLY OF THE COMPOSITE TEXTILE OR FABRIC TYPE

[75] Inventors: Serge Gosset, Lestrem; Jean-Claude Lumaret, Bethune, both of France

[73] Assignee: Roquette Freres Société Anonyme, Lestrem, France

[21] Appl. No.: 732,570

[22] Filed: May 10, 1985

[30] Foreign Application Priority Data

May 17, 1984 [FR] France .................................. 84 07668

[51] Int. Cl.$^4$ .......................... B05D 3/02; C08L 3/00
[52] U.S. Cl. .................. 427/389.9; 106/213; 427/55; 524/47; 524/48; 524/49; 524/50
[58] Field of Search ............................. 524/915, 47-50; 428/95, 96; 106/213; 427/55, 389.9

[56] References Cited

U.S. PATENT DOCUMENTS

| 3,632,535 | 1/1972 | Gramera et al. .................. 260/17.4 |
| 4,055,694 | 10/1977 | Hadgraft et al. ..................... 428/95 |
| 4,104,212 | 8/1978 | Bruner .................................. 524/47 |
| 4,104,213 | 8/1978 | Chiang et al. ..................... 260/17.3 |
| 4,138,518 | 2/1979 | Sammak et al. ...................... 428/95 |
| 4,368,282 | 1/1983 | Bogdany ............................ 524/915 |
| 4,374,884 | 2/1983 | Kwok et al. ........................... 428/96 |

FOREIGN PATENT DOCUMENTS

| 776 | 2/1979 | European Pat. Off. . |
| 2332130 | 6/1977 | France . |
| 166731 | 8/1921 | United Kingdom . |
| 706259 | 3/1954 | United Kingdom . |
| 906562 | 9/1962 | United Kingdom . |

Primary Examiner—Theodore Morris
Attorney, Agent, or Firm—Fleit, Jacobson, Cohn & Price

[57] ABSTRACT

Amylaceous composition of mixtures based on synthetic or natural binders or compounds employed in the manufacture of certain textile or paratextile products and particularly of the composite textile type. It comprises:

from 7% to 45% by weight, preferably from 10% to 25% by weight, of a starch swelling in cold water, if necessary modified chemically, from 55% to 93% by weight, preferably from 70% to 85% by weight, of granular starch, modified chemically.

10 Claims, No Drawings

AMYLACEOUS COMPOSITION FOR MIXTURES BASED ON SYNTHETIC OR NATURAL BINDERS EMPLOYED IN THE MANUFACTURE OF CERTIAN TEXTILE OR PARATEXTILE PRODUCTS, PARTICULARLY OF THE COMPOSITE TEXTILE OR FABRIC TYPE

BACKGROUND OF THE INVENTION

The invention relates to an amylaceous composition for mixtures based on synthetic or natural binders or bonding agents employed in the manufacture of certain textile or paratextile products, particularly of the composite textile or fabric type.

The mixtures concerned are generally denoted in the art and hereafter by the term "compound". Furthermore, the synthetic or natural binders, which represent the essential constituent and, in certain cases, the only constituent of the compounds, are denoted by the term "latex"; they are in the form of aqueous dispersions of synthetic polymers or of natural rubber.

The said mixtures based on synthetic or natural binders also called compounds, find numerous applications in processes known in themselves of manufacturing textile and paratextile products, particularly of the composite textile or fabric type; certain steps of the said processes constitute bonding operations, particularly at the moment of assembling the constituent parts of the textile composites, such as carpets, tufted carpets or needleloom carpets, and others of the type comprising a foam "backing" or again of textile which constitute a secondary laminating, the assembly being generally denoted by the term "double backing" when the "backing" is of textile material.

The viscosity of the compounds must be such that they penetrate just sufficiently into the textile material to give the desired adherence between the constituents parts of the product.

Besides the one or more synthetic polymers and/or natural rubber, the compounds comprise generally fillers, particularly inorganic fillers, conferring on the finished textile products, flame-proofing properties, rigidity, color and the like. They may also contain, among other things, one or several of the following constituents:
  anti-oxidants
  anti-foaming products
  plasticizers
  thickeners
  vulcanizing agents
  emulsifiers
  dispersing agents.

To be competitive, the textile products thus manufactured with the use of compounds based on synthetic or natural bonding agents or latex, must respond particularly to criteria of solidity which, for example in the case of carpets of the "double backing" type, are manifested by a sufficient resistance to the separation of the constituent parts of the carpet.

It has already been proposed, with the object of improving thereof the properties of viscosity and/or the cohesive power, to introduce into the composition of the above-said compounds, various thickening agents of which certain are amylaceous products, constituted by:
  either pregelatinised starches,
  or gelatinised starch pastes,
  or starches in granular form, insoluble in cold water, possibly modified previously by chemical means, and possibly employed in the presence of certain chemical agents, which can lower the gelatinisation temperature thereof.

In this connection, it is possible to mention the French Pat. No. 2,332,130.

None of the solutions thus proposed has led to results satisfactory in all respects.

Thus the use of pregelatinised starches or starch pastes, leads to the obtaining of bonding compositions having excessive viscosities, incompatible with the operating conditions on a machine.

The use of granular starches can result, for its part, in precipitation problems, in particular in the field of full immersion needleloom carpets.

On the other hand, the instantaneous adherence power is non-existant, and the cohesive power on emerging from drying, may be judged insufficient.

GENERAL DESCRIPTION OF THE INVENTION

According to the invention, applicants have perfected an amylaceous composition which permits, when it replaces in the formulation of a compound of the type concerned, a proportion from about 5% to 30% of the dry natural or synthetic binder, to increase decisively the cohesion of textile products manufactured by means of these compounds.

Due to the fact of this decisive increase in cohesion, the proportion of fillers can be increased in the final formulation, whilst preserving a still satisfactory strength.

This increase in the ratio of fillers as well as the substitution of a portion of the latices by the amylaceous composition according to the invention is manifested by a very appreciable reduction in the cost price of the finished textile product.

In addition to the advantages which have just been indicated, the use of the amylaceous composition according to the invention confers on the corresponding compound a remarkable instantaneous bonding power, enabling the avoidance of the displacement or moving with respect to one another of the constituent parts of the textile product in the manufacture of which the compound is used in the course of the manipulations preceding the passage into the drying chamber.

The amylaceous composition concerned, which is advantageously in the form of a powder mixture or a paste, (generally with less than 35% of water), comprises according to the invention:
  from 7% to 45% by weight, preferably from 10% to 25% by weight, of a starch swelling in cold water, possibly modified chemically,
  from 55% to 93% by weight, preferably from 70% to 85% by weight, of granular starch, modified chemically, preferably by oxidation.

Advantageously, there is added to the above-said composition from 0.2% to 4%, preferably from 0.5% to 2.5% by weight of at least one alkaline agent adapted to lower the gelatinisation temperature of the granular starch, these percentages being expressed in OH− equivalents with respect to the total starch of the composition.

In an advantageous embodiment of the invention, there is added to the above-said amylaceous composition, from 0.1% to 10% and, preferably, from 0.2% to 5% by weight of borax, this introduction of borax enabling the cohesive power to be improved.

The composition according to the invention can also comprise plasticising agents, such as urea and sodium nitrate and deaerating agents, such as those known under the trademark ALBEGAL and IRGAPADOL FFU, marketed by CIBA GEIGY.

The invention is directed also at mixtures based on synthetic or natural bonding agents, or compounds employed in the manufacture, particularly of textile products, in particular of the composite type in which a proportion of about 5% to 30% by weight of the dry binder is replaced by an equivalent amount of the amylaceous composition according to the invention.

Finally, the invention provides a process for the preparation of textile products, particularly of the composite type, comprising the employment of a mixture based on synthetic or natural bonding agents or compounds, in which a proportion from about 5% to about 30% by weight of the dry bonding agent is replaced by an equivalent amount of the amylaceous composition according to the invention, or by its constituents introduced separately.

The cold water swelling starch, entering into the constitution of the composition according to the invention, may be obtained by a treatment of physical modification of the drum gelatinisation type or, preferably, by cooking-extrusion, from native or modified starches, from any source comprising natural or hybrid starches from potatoes, manioc, corn, waxy corn, high amylose content corn, wheat, rice and the like. It can also be obtained by chemical modification of starch, such as esterification or etherification, this modification being sufficient to render the starch swelling in water at room temperature.

The same native starches from any source are used in granular form in the composition according to the invention, after having been subjected to a chemical modification treatment consisting, preferably, of an oxidation, but which can also be constituted by an esterification, and etherification, a cross-linking, or an acid or enzymatic fluidization, or a combination of these treatments.

The agents suitable for lowering the gelatinisation temperature of the granular starch, or sensitisers, and which are preferentially added to the composition according to the invention, may be selected from the group comprising in particular NaOH, KOH, urea, sodium carbonate and lime, as well as mixtures thereof.

DESCRIPTION OF PREFERRED EMBODIMENTS

The invention will be better understood by means of the comparative examples which follow, and in which advantageous embodiments are described, purely by way of non-limiting illustration.

EXAMPLE 1

This example compares the values of the cohesivity, measured by means of the INSTRON model 1122 apparatus, and expressed in Newtons (N), in the case of the manufacture of a composite laminated textile product of the "double backing" type (formed by a carpet of the "tufted" type and by a "backing" of polypropylene) by means of three formulations based on synthetic binders according to the prior art, and two formulations comprising an amylaceous composition according to the invention.

The manufacture of the "double backing" was carried out according to the following operational phases:

Preparation of the formulation based on latex,
Application by roll of the compound so obtained to the back of the carpet,
Laminating of the secundary "backing" to the carpet,
Calendering,
Drying in a ventilated oven,
Conditioning of the finished product, that is to say, of the "double backing".

There is then prepared, from the "double backing" thus produced, samples or specimens, subjected to measurement of the cohesivity, by cutting out strips 5 cm wide.

The concentration of dry matter of the above-said formulations based on latex required for the manufacture of these "double backings" is 75%.

The amounts of compound employed are 1000 g of commercial product per m² of "double backing". The drying period is arbitrarily fixed at 15 minutes for a temperature of 150° C.

The three formulations based on latex or compound according to the prior art are constituted as follows:

Formulation A

This is a mixture without amylaceous product.
At ambient temperature there are mixed:

100 parts by weight (expressed on dry matter) of synthetic binder in the form of an aqueous dispersion with 50% of dry matter, known under the trademark "Latex Dow Chemical XDS 84 18 06", 2 parts by weight of sodium tripolyphosphate or TSPP as dispersing agent, 400 parts by weight of inorganic filler constituted by $CaCO_3$.

A sufficient amount of water is added to bring the content of dry matter of the formulation to 75%.

Then the viscosity of this mixture is brought to 10,000 cps (measured on the Brookfield type RVF apparatus, spindle No. 5, 20 r.p.m.) by adding the necessary amount of sodium polyacrylate with 12.5% of active material (for example that marketed by the Protex Company, under the name "ACRYLRON A 300").

Formulation B

This is a mixture comprising, as amylaceous product, an extruded starch.

In this mixture, the extruded starch must replace about 20 parts of dry synthetic binder of the formulation A.

To prepare it, there are mixed 80 parts by weight (dry) of the synthetic binder used for formulation A, about 20 parts by weight of an extruded corn starch (obtained on a double screw extruder of the Creusot-Loire brand, and characterised, on the one hand, by a viscosity of 50 cps with 5% of dry matter and, on the other hand, by a ratio of soluble matter of about 50% in water at room temperature, this extruded starch being essentially non-birefringent) to which is added an amount of borax corresponding to 1.3% by weight of the total amount of the starch present, 2 parts by weight of TSPP.

It was attempted to introduce 400 parts by weight of the same inorganic filler as that used to prepare formulation A; this introduction was impossible due to the fact of the high viscosity developed by the extruded starch; to overcome this drawback, it would have been necessary to add an amount of water such that it would not have been possible to respect the 75% of dry matter required.

Hence, it was not possible to prepare this formulation.

Formulation C

This is a mixture comprising, as amylaceous product, granular native potato starch; the mixture includes in addition a mixture adapted to lower the gelatinisation point of the starch.

Formulation C is prepared from:

80 parts by weight (dry) of the synthetic binder used for formulation A, 19 parts by weight of a native potato starch to which is also added 1.36% by weight, with respect to the total amount of starch, of borax, and 3.9% by weight of an equimolecular mixture of lime and sodium carbonate, 2 parts by weight of TSPP, 400 parts by weight of the inorganic filler provided for formulation A, sufficient amounts of water to bring the content of dry matter to 75% and of polyacrylate of the brand "ACRYLRON A 300" to obtain a viscosity of 10,000 cps.

Formulation D

This is a mixture comprising, as starch product, a composition according to the invention constituted from:

79.8% by weight of a potato starch modified by acetylation and by fluidization, having an acetyl index of 1.5, 20.2% by weight of the extruded corn starch, used in formulation B.

This mixture of starches is present in the proportion of 18.8% by weight, whilst the synthetic bonding agent (identical with that of formulation A) is again present in the proportion of 80 parts by weight.

The starch mixture defined previously is supplemented with an amount of borax corresponding to 1.63% by weight of the total amount of starch present, and an amount, equal to 4.37% by weight with respect to the total amount of starch, of the equimolecular composition of lime and sodium carbonate identified in formulation C.

In addition, the formulation concerned comprises two parts by weight of TSPP and 400 parts by weight of the inorganic filler used for formulation A.

Finally, the amount of water sufficient to obtain a content of dry matter of the formulation equal to 75% and the amount necessary of polyacrylate of the brand "ACRYLRON A 300" to bring the viscosity of the finished formulation to 10,000 cps, are added.

Formulation E

This is a mixture comprising, as starch product, a composition according to the invention constituted by:

79.8% by weight of potato starch modified by oxidation so that, for a ratio of 10% dry matter, after cooking in live steam for five minutes at 90° C., the starch gave in water a viscosity of 20 cps at 50° C., 20.2% by weight of the extruded corn starch of the formulation D.

This starch mixture is present in the proportion of 18.8% by weight, whilst the synthetic binder (identical with that of formulation A) is again present in the proportion of 80 parts by weight.

The previously defined starch mixture is supplemented with the same amounts (as in formulation D) of borax and of the equimolecular mixture of lime and sodium carbonate.

In addition, the formulation concerned comprises 2 parts by weight of TSPP and 400 parts by weight of the inorganic filler used for formulation A.

Finally, the formulation is brought to 75% of dry matter and 10,000 cps according to the same operational method as previously used.

By means of the four formulations thus established (it is recalled that it has not been possible to terminate formulation B), as many specimens of "double backing" were fabricated by proceeding as indicated above.

In addition, by resorting to viscosity measurements carried out (on the one hand, at the time of manufacture, on the other hand, after 24 hours without stirring and, on the other hand again, after 24 hours without stirring followed by 5 minutes stirring) in a manner indicated above with respect to formulation A, it was shown that the replacement of about 20 parts by weight of the synthetic bonding agent by the composition according to the invention does not result in any disturbance of the stability of the formulation.

In addition, it is noted that the replacement of the bonding agent by the composition according to the invention, results in the amount of sodium polyacrylate to be added to the formulation being less.

The values read in the measurements of cohesivity carried out on the four specimens of "double backing" thus prepared, are collected in Table I.

TABLE I

| Formulation | A | C | D | E |
|---|---|---|---|---|
| Cohesivity (in N) | 25 | 18 | 46 | 64 |

Examination of these values shows indiscutably the advantage contributed by the use of the composition according to the invention.

EXAMPLE 2

This comparative example establishes the higher cohesivity presented by a formulation according to the invention (formulation E) with respect to a formulation F, identical with formulation E, with the only difference that this formulation F comprises a native potato starch in replacement of the oxidation potato starch constitutive of the granular portion of the starch mixture.

Formulation F is hence constituted for its amylaceous part by a composition containing:

79.8% by weight of a native potato starch, 20.2% by weight of the extruded corn starch of formulation E.

The values obtained in the course of the cohesivity measurements carried out on the specimens produced from formulations E and F are presented in Table II.

TABLE II

| Formulation | E | F |
|---|---|---|
| Cohesivity (in N) | 64 | 30 |

Comparison of these two values show distinctly the advantage contributed by the choice, for the granular part, of a modified starch in place of a native starch.

EXAMPLE 3

This comparative example shows that, due to the fact of the increased cohesivity conferred on the compound due to the composition according to the invention, it is possible to increase the proportion of inorganic filler in the final formulation of the compound whilst preserving sufficient cohesivity.

Three specimens of "double backing" are prepared in the manner indicated above by using successively:

formulation A of example 1, a formulation G identical with the formulation A with the slight difference that instead of 400 parts of weight of inorganic filler, 500 parts by weight thereof are used, a formulation H identical with the formulation D of Example 1 with the only difference that instead of 400 parts by weight of inorganic filler, there are introduced 500 parts by weight of this filler.

The measurements of cohesivity were carried out as in Example 1.

The values recorded are collected in Table III.

TABLE III

| Formulation    | A  | G  | H  |
|----------------|----|----|----|
| Cohesivity (in N) | 25 | 21 | 38 |

It is observed that the cohesivity is still very satisfactory with formulation H due to which there is applied less synthetic binder, a costly product, per square meter of "double backing".

EXAMPLE 4

In this example, the values of the cohesivity, measured by means of the Lhomargy dynamometer device and expressed in g per 5 cm, in the case of the application of a foam sub-layer on the back of a needleloom carpet, by means of two formulations based on synthetic binders, one according to the prior art, the other including a composition according to the invention, are compared.

The manufacture of this type of carpet is carried out in the following operational phases:

Preparation of the needleloom carpet
formation of the fibre web
formation of the voile: passage of the web through a card
needling of the voile
immersion of the needleloom voile in a latex bath
drying in a ventilated oven.
Application of a foam backing
Preparation of the latex-based formulation. The concentration of dry matter required for the manufacture of these foam backings is 75%.
Application with the roll of the foamed compound to the back of the needleloom carpet. The amounts of the compound employed are 600 g of commercial product per m² of needleloom carpet,
Drying the infra-red
Drying in a ventilated oven at 150° C. for 5 minutes,
Conditioning of the finished product.

From the carpet so-produced, specimens were prepared and subjected to measurement of the cohesivity by cutting out strips 5 cm wide and 18 cm long.

| FORMULATION (DRY) | I | J |
|---|---|---|
| Latex | 90 | 90 |
| Starch | 10 (type F) | 10 (type E) |
| Soap | 3 | 3 |
| Lauryl sulfate | 1 | 1 |
| Dispersing Agent | 1 | 1 |
| Calgon | 2 | 2 |
| Vulcanising agent | 5.5 | 5.5 |
| Filler | 170 | 170 |
| Water | qsp | qsp |
| Brookfield viscosity RVT 10 revs (poises) | 25 | 22 |
| Delamination (g/5 cm) | 590 | 630 |

Examination of these values shows the advantage obtained by the use of the composition according to the invention in the manufacture of a "foam" backing.

As is self-evident, and as emerges besides already from the foregoing, the invention is in no way limited to those of its types of application and embodiments which have been more especially envisaged; it encompasses, on the contrary, all modifications.

We claim:

1. In a process for the preparation of textile or paratextile products, particularly of the composite textile or fabric type, comprising successively selecting of a mixture based on synthetic or natural bonding agents or compounds, applying the said mixture to a constituent part of the textile to be prepared, drying and conditioning of the finished product, the improvement according to which the mixture based on synthetic or natural bonding agents or compounds as selected is characterized by the fact that a proportion of about 5% to about 30% by weight of the dry bonding agents is replaced by an equivalent amount of a composition comprising:

from 7% to 45% by weight of a starch swelling in cold water, obtained by one of the treatments comprising physical and chemical modification, the physical modification being selected from drum gelatinization type treatment and cooking-extrusion and the chemical modification being selected from esterification and etherification, from 55% to 93% by weight of granular starch, modified chemically, from 0.2% to 4% by weight, expressed in $OH^-$ equivalents with respect to the total starch of the composition, of at least one alkaline agent adapted to lower the gelatinization temperature of the granular starch.

2. Process according to claim 1, wherein the said composition comprises:

from 10% to 25% by weight of a starch swelling in cold water, obtained by one of the treatments comprising physical and chemical modification, the physical modification being selected from drum gelatinization type treatment and cooking-extrusion and the chemical modification being selected from esterification and etherification, from 70% to 85% by weight of granular starch, modified chemically, from 0.2% to 4% by weight, expressed in $OH^-$ equivalents with respect to the total starch of the composition, of at least one alkaline agent adapted to lower the gelatinisation temperature of the granular starch.

3. Process according to claim 1, wherein the said composition comprises from 0.1 to 10% by weight of borax.

4. Process according to claim 2, wherein the said composition comprises from 0.1 to 10% by weight of borax.

5. Process according to claim 1, wherein the said composition comprises from 0.2 to 5% by weight of borax.

6. Process according to claim 2, wherein the said composition comprises from 0.2 to 5% by weight of borax.

7. Process according to claim 1, wherein the constituents of the said composition are introduced separately.

8. Process according to claim 1, wherein the said composition comprises granular starch modified by oxidation.

9. Process according to claim 1, wherein the said composition comprises granular starch modified by acetylation and fluidization.

10. Process according to claim 1, wherein the said composition comprises from 0.5% to 2.5% by weight, expressed in $OH^-$ equivalents with respect to the total starch of the composition, of at least one alkaline agent adapted to lower the gelatinisation temperature of the granular starch.

* * * * *